(12) United States Patent
Kim et al.

(10) Patent No.: US 10,880,081 B2
(45) Date of Patent: Dec. 29, 2020

(54) STORAGE DEVICE AND STORAGE SYSTEM CONFIGURED TO PERFORM ENCRYPTION BASED ON ENCRYPTION KEY IN FILE UNIT AND METHOD OF OPERATING USING THE SAME

(71) Applicant: Samsung Electronics Co., Ltd., Suwon-si (KR)

(72) Inventors: Seokhwan Kim, Seoul (KR); Jun-Ho Jang, Hwaseong-si (KR); Seongjun Ahn, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 221 days.

(21) Appl. No.: 16/030,087

(22) Filed: Jul. 9, 2018

(65) Prior Publication Data
US 2019/0199520 A1 Jun. 27, 2019

(30) Foreign Application Priority Data
Dec. 27, 2017 (KR) .......................... 10-2017-0180795

(51) Int. Cl.
*H04L 9/08* (2006.01)
*G06F 7/58* (2006.01)
*G06F 16/16* (2019.01)

(52) U.S. Cl.
CPC .............. *H04L 9/088* (2013.01); *G06F 7/588* (2013.01); *G06F 16/164* (2019.01); *H04L 9/0866* (2013.01)

(58) Field of Classification Search
None
See application file for complete search history.

(56) References Cited

U.S. PATENT DOCUMENTS

| | | |
|---|---|---|
| 8,117,377 B2 | 2/2012 | Park et al. |
| 8,250,380 B2 | 8/2012 | Guyot et al. |
| 8,521,949 B2 | 8/2013 | Xiong et al. |
| 8,909,888 B2 | 12/2014 | Goss et al. |
| 8,918,651 B2 | 12/2014 | Greco et al. |
| 9,015,401 B2 | 4/2015 | Hars et al. |
| 9,069,978 B2 | 6/2015 | Yuan |
| 9,749,132 B1* | 8/2017 | Hamilton ................. G06F 21/10 |
| 10,474,831 B1* | 11/2019 | Volkanov ............... H04L 9/0833 |
| 2008/0065905 A1* | 3/2008 | Salessi ..................... G06F 21/31 713/193 |
| 2008/0307155 A1* | 12/2008 | Sinclair .................. G06F 3/0679 711/103 |
| 2012/0079289 A1 | 3/2012 | Weng et al. |
| 2012/0278564 A1* | 11/2012 | Goss ....................... G06F 12/00 711/155 |
| 2015/0006911 A1 | 1/2015 | Cochran et al. |
| 2015/0143035 A1* | 5/2015 | Choi ...................... G06F 3/0619 711/103 |
| 2018/0225200 A1* | 8/2018 | Seo ...................... G06F 12/0246 |

* cited by examiner

*Primary Examiner* — Henry Tsang
(74) *Attorney, Agent, or Firm* — Harness, Dickey & Pierce, P.L.C.

(57) ABSTRACT

A storage system includes a host device and a storage device. The host device generates a file, and generates a unique file identifier (UFID) for each file, wherein the UFID is based on an identifier of the generated file and at least one logical address corresponding to the generated file. The storage device generates a key for encrypting or decrypting write data corresponding to the generated file based on the UFID and a random number, and encrypts the write data by using the key.

20 Claims, 13 Drawing Sheets

STORAGE DEVICE AND STORAGE SYSTEM CONFIGURED TO PERFORM ENCRYPTION BASED ON ENCRYPTION KEY IN FILE UNIT AND METHOD OF OPERATING USING THE SAME

CROSS-REFERENCE TO RELATED APPLICATIONS

This application claims priority under 35 U.S.C. § 119 to Korean Patent Application No. 10-2017-0180795 filed on Dec. 27, 2017 in the Korean Intellectual Property Office, the disclosures of which are incorporated by reference herein in their entireties.

BACKGROUND

Example embodiments of the inventive concepts relate to a storage system, and more particularly, a storage system for generating an encryption key in a file unit and an operating method thereof.

Semiconductor memory devices are classified into volatile memory devices, which lose data stored therein at power-off, such as a static random access memory (SRAM), a dynamic RAM (DRAM), a synchronous DRAM (SDRAM), and the like, and nonvolatile memory devices, which retain data stored therein even at power-off, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and the like.

In particular, in the case of a nonvolatile memory device having an erase before write characteristic, even though a "logical erase" operation is performed, data stored in the nonvolatile memory device may not be completely erased physically. That is, only a mapping relationship between logical addresses and physical addresses of data stored in the nonvolatile memory device is released, and data may not be completely erased physically. In general, a substantial period of time may occur between logical erase and physical erase. Therefore, there is an important issue to be addressed with regard to security/encryption of data stored in the nonvolatile memory device.

Meanwhile, as a technique for improving the level of security of the nonvolatile memory device, a method of physically erasing data is being used. For example, after data is logically erased, in a case where a storage space of the memory device is insufficient, a garbage collection operation (e.g., sanitize, purge, etc.) for physically erasing data may be performed. However, frequent write and erase operations may cause a decrease in performance of the nonvolatile memory device and lead to a shorter lifespan thereof.

In addition, a method of generating an encryption key is widely used to improve the level of security of the memory device. However, in the case of a method of performing encryption based on a logical address of data, since encryption key(s) associated with all logical addresses of a file is/are generated and encryption is performed on all logical addresses, the number of encryption keys and/or the size of an encryption key may increase. This causes difficulty in management and an increase in complexity of the system. Therefore, there is a need for a technique for generating an encryption key capable of improving the level of security without causing the increase in the complexity of the system.

SUMMARY

Some example embodiments of the inventive concepts are directed to reducing a key size, while maintaining a required (and/or desired) level of security, by generating an encryption key in a file unit.

According to some example embodiments, a storage system includes a host device that generates a file, and generates a unique file identifier (UFID) for each file, wherein the UFID is based on an identifier of the generated file and at least one logical address corresponding to the generated file, and a storage device that generates a key for encrypting or decrypting write data corresponding to the generated file based on the UFID and a random number, and encrypts the write data by using the key.

According to some example embodiments, a storage device includes a controller that generates an encryption key by using a unique file identifier (UFID), which is generated for each file based on an identifier of a file generated on a file system and at least one logical address corresponding to the generated file, and a nonvolatile memory device that stores the encryption key in association with the UFID.

According to some example embodiments, a method of operation of a storage system, which includes a host device and a storage device, includes generating a file, generating a unique file identifier (UFID) for each file, based on an identifier of the generated file and at least one logical address corresponding to the generated file, transmitting the UFID from the host device to the storage device, and generating a key for encrypting or decrypting write data corresponding to the generated file, based on the UFID received from the host device and a random number.

BRIEF DESCRIPTION OF THE FIGURES

The above and other objects and features of the inventive concepts will become apparent by describing in detail exemplary embodiments thereof with reference to the accompanying drawings.

DETAILED DESCRIPTION

Below, some example embodiments of the inventive concepts may be described in detail and clearly to such an extent that one having ordinary skill in the art may easily implement the inventive concepts.

Some example embodiments may be described with reference to acts and symbolic representations of operations (e.g., in the form of flow charts, flow diagrams, data flow diagrams, structure diagrams, block diagrams, etc.) that may be implemented in conjunction with various units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

Figure 1:
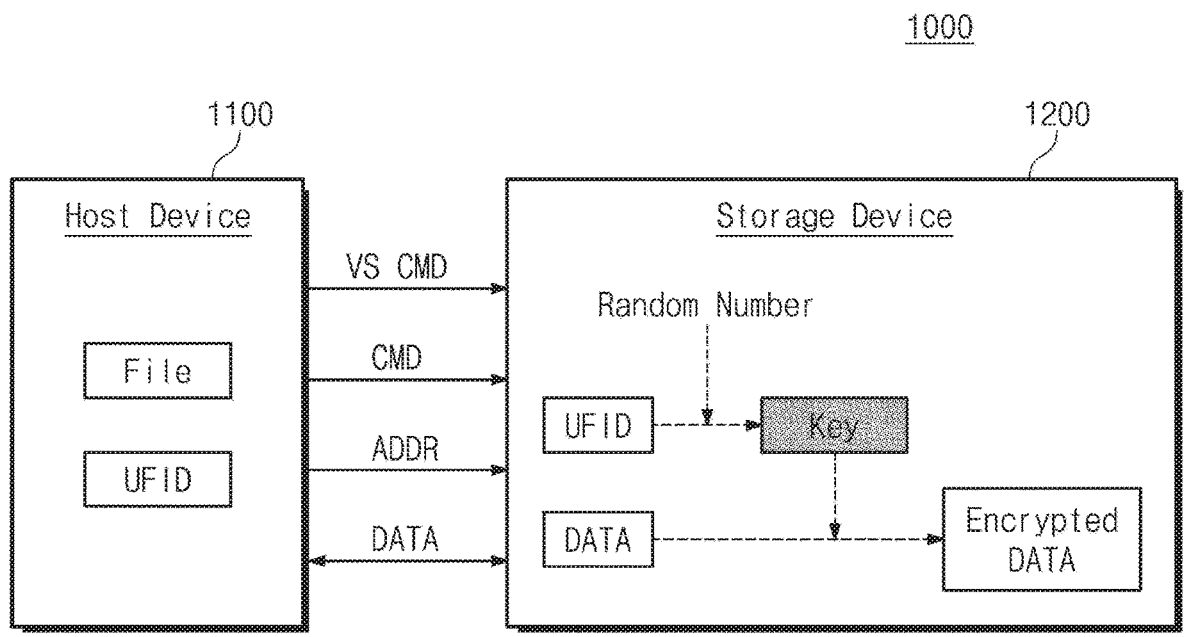
FIG. 1 is a block diagram illustrating an exemplary configuration of a storage system according to some example embodiments of the inventive concepts.

FIG. 1 is a block diagram illustrating an exemplary configuration of a storage system 1000 according to some example embodiments of the inventive concepts. The storage system 1000 may include a host device 1100 and a storage device 1200.

The host device 1100 may manage and process overall operations of the storage system 1000. The host device 1100 may drive an operating system OS that is based on a file system. The host device 1100 may perform various arithmetic operations/logical operations.

For example, the host device 1100 may include one or more processor cores. The host device 1100 may be implemented to include dedicated circuits (e.g., field programmable gate arrays (FPGA) and application specific integrated circuits (ASICs)) or may be implemented with a system on chip (SoC). For example, the host device 1100 may include a general-purpose processor, a special-purpose processor, or an application processor. The host device 1100 may be a processor itself, or an electronic device or a system including a processor.

The host device 1100 may generate a command CMD according to a request of a user. For example, the host device 1100 may generate a write command and write data according to a write request for the storage device 1200. The write data may be a file that is generated on the host device 1100 according to the write request. The file is stored in the storage device 1200 based on the write command and an address ADDR. Alternatively, the host device 1100 may generate a read command according to a read request for the storage device 1200. Data may be read from the storage device 1200 based on the read command and an address ADDR. Alternatively, data stored in the storage device 1200 may be deleted by an erase command.

The host device 1100 may generate a unique file identifier (UFID) based on an identifier ID and a logical address ADDR of the file. For example, the identifier ID of the file may be an ID of a file in the file system, and the logical address ADDR may be a start address of the file in the file system. However, some example embodiments of the inventive concepts are not limited thereto. The unique file ID UFID may correspond to all logical addresses of the file, according to some example embodiments.

The host device 1100 may transmit unique file identifier (UFID) to the storage device 1200 by using a vendor specific command VS CMD. The unique file ID UFID may be used to encrypt and/or decrypt data, which will be more fully described later. The unique file ID UFID that forms the basis of encryption/decryption corresponds to all logical addresses of a file.

In the case of a write request, the host device 1100 may transmit write data, the address ADDR, and the unique file ID UFID, which correspond to a file, to the storage device 1200. In the case of a read request, the host device 1100 may transmit the address ADDR and the unique file ID UFID to the storage device 1200. In the case of a data delete request, the host device 1100 may transmit the unique file ID UFID and a vendor specific command VS CMD for deleting a key value corresponding to the unique file ID UFID to the storage device 1200.

The storage device 1200 may be configured to encrypt the unique file ID UFID received from the host device 1100. For example, the storage device 1200 may generate a key value by using a random number and the unique file ID UFID. For example, a key value generator (not illustrated) which is implemented by software and/or hardware may be used. The storage device 1200 may be configured to encrypt the generated key value and data (i.e., write data corresponding to a file) received from the host device 1100. The key value corresponds to one file having a plurality of logical addresses.

The storage device 1200 may be configured to decrypt data based on a read command and the unique file ID UFID received from the host device 1100. In addition, the storage device 1200 may delete a key value corresponding to the unique file ID UFID in response to an erase request received from the host device 1100. In this case, the deletion of the key value may be physical erase, not logical erase, such that the key value is completely erased from the storage device 1200.

According to the encryption/decryption operations of some example embodiments of the inventive concepts briefly described above, unlike a general case, an encryption (and/or decryption) key is generated for each file, not for each logical address. According to a general encryption key generating method, since encryption keys respectively corresponding to all logical addresses of a file are generated, a key size may excessively become larger. However, it may be possible to decrease a key size, without a corresponding decrease in the level of security, through a file-based encryption key generating method or a method of generating an encryption key for each file (or by the file), according to some example embodiments of the inventive concepts.

Figure 2:
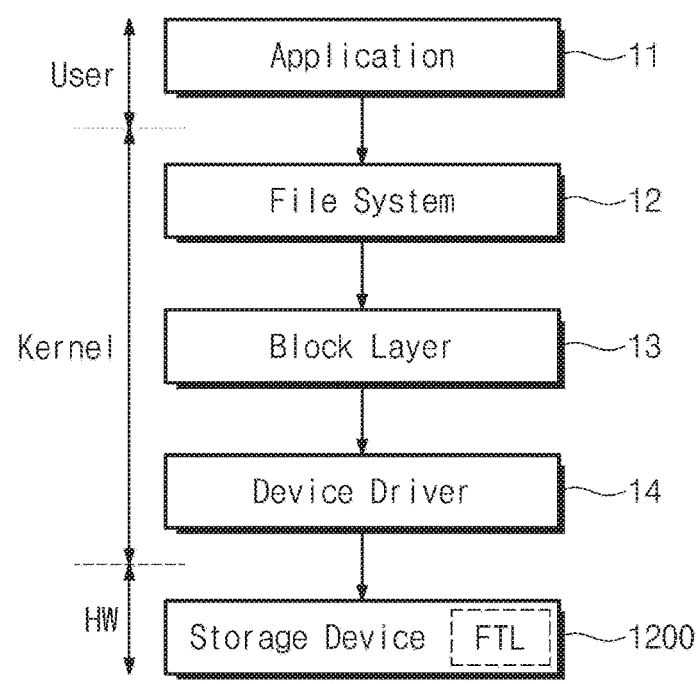
FIG. 2 is a block diagram illustrating software/hardware layers for driving a storage system of FIG. 1.

FIG. 2 is a block diagram illustrating software/hardware layers for driving a storage system of FIG. 1. In an embodiment, an application 11, a file system 12, a block layer 13, and a device driver 14, which are driven on the host device 1100, and the storage device 1200 are illustrated. For better understanding, a description will be given with reference to FIG. 1 together.

The application 11 may include various application programs that are driven in the operating system OS of the host device 1100, such as a document editor, a web browser, a spreadsheet, a voice player, an image player, and the like, for example.

The file system 12 organizes files or data that are exchanged with the storage device 1200. The file system 12 provides a logical address for accessing a storage space of the storage device 1200. For example, the file system 12 may include FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, WinFS, or the like. For example, the file system 12 may manage files or data in a sector and/or cluster unit.

For example, unlike the illustration of FIG. 2, software/hardware layers for driving a storage system according to some example embodiments of the inventive concepts may include a plurality of file systems. In this case, the file systems may be distinguished from each other by a start address in a drive. In addition, files may be distinguished from each other by an ID of a file in a file system to which the files belong. For example, even though the size of a file system may be reduced or enlarged, a start address of the file system and/or a start address of a file itself may not change.

The block layer 13 provides an abstraction layer for communication between the file system 12 and the device driver 14.

The device driver 14 may control devices included in the host device 1100 and devices connected with the host device 1100. The device driver 14 may convert general input/output instructions of the operating system OS to messages corresponding to respective devices. The device driver 14 may control the storage device 1200. For example, the device driver 14 may transmit a command CMD, an address ADDR, and data "DATA" to the storage device 1200 in response to a read request of the user, the application 11, or the operating system OS or may transmit a command CMD, an address ADDR, and data "DATA" to the storage device 1200 in response to a write request thereof.

The storage device 1200 may drive a flash translation layer FTL. The flash translation layer FTL performs interfacing between the file system 12 and the storage device 1200. For example, the flash translation layer FTL performs mapping between a logical address of the file system 12 and a physical address of the storage device 1200. Upon receiving a write request, the flash translation layer FTL assigns a physical address to an ID of a file (or write data). In addition, the flash translation layer FTL may further perform garbage collection, wear leveling, etc. of the storage device 1200.

Figure 3:
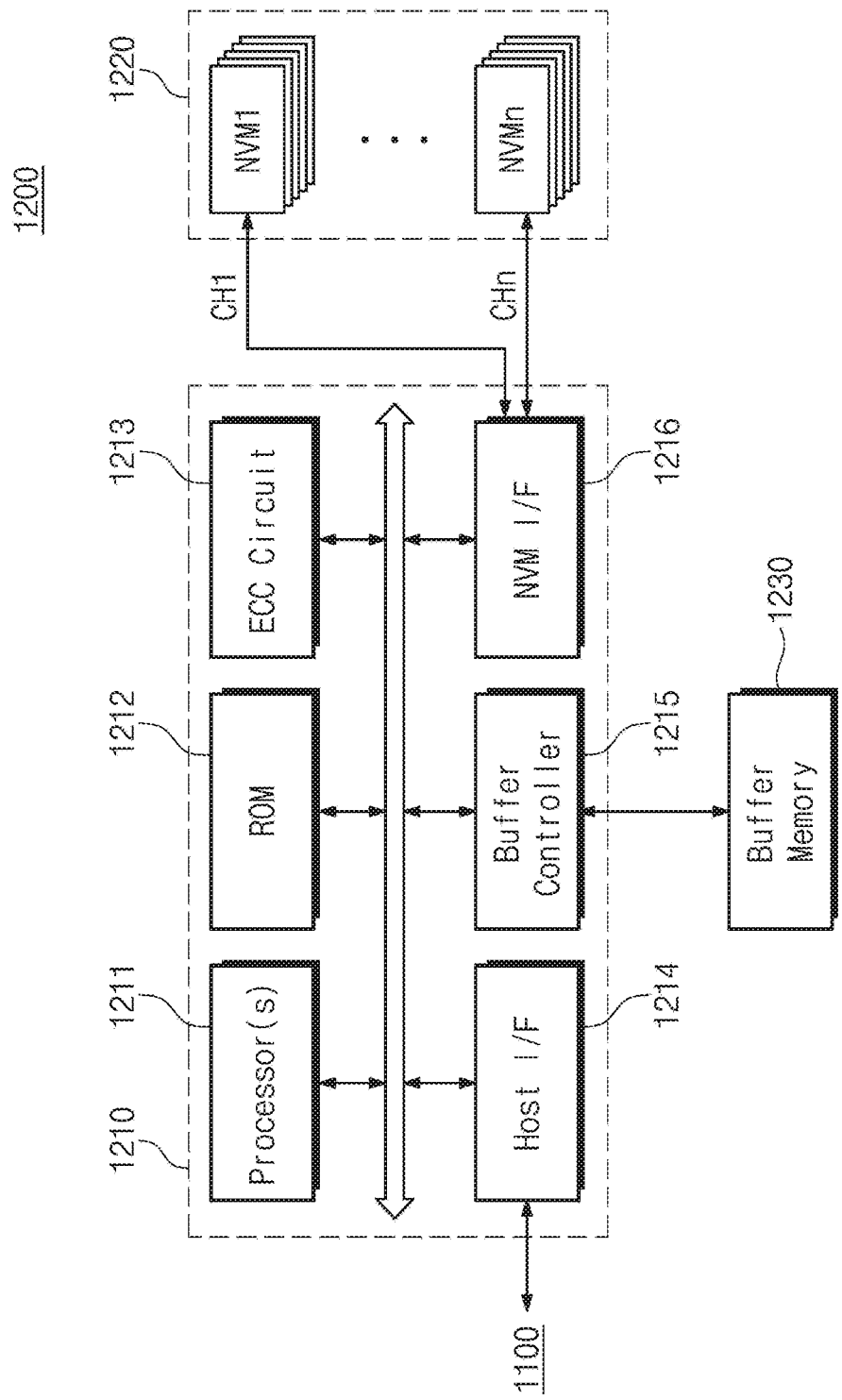
FIG. 3 is a block diagram illustrating an exemplary configuration of a storage device illustrated in FIG. 2.

FIG. 3 is a block diagram illustrating an exemplary configuration of the storage device 1200 illustrated in FIG. 2. A controller 1210 of the storage device 1200 may include at least one processor 1211, a read only memory (ROM) 1212, and an error-correcting code (ECC) circuit 1213. In addition, the controller 1210 may further include a host interface (I/F) 1214 for performing interfacing with the host device 1100 in compliance with various protocols, a buffer manager 1215 for managing/controlling a buffer memory 1230, and a nonvolatile memory interface (I/F) 1216 for performing interfacing with a nonvolatile memory device 1220.

The processor 1211 may control overall operations of the controller 1210. The processor 1211 may drive various firmware/software needed to operate the controller 1210 or to control the nonvolatile memory devices 1220. For example, the processor 1211 may drive a flash translation layer (FTL) for managing a mapping table in which a relationship between logical addresses and physical addresses of a plurality of nonvolatile memories NVM1 to NVMn is defined.

The ROM 1212 may store a boot code needed to boot the storage device 1200. In addition, the ROM 1212 may store separate firmware for loading firmware stored in the nonvolatile memory device 1220 onto the buffer memory 1230. For example, the firmware stored in the ROM 1212 may be executed upon booting on the storage device 1200 or may be executed according to the external request (e.g., host) or an internal request during a runtime of the storage device 1200.

The ECC circuit 1213 may detect and correct an error of data read from the nonvolatile memory device 1220.

The host interface 1214 may perform communication with the host device 1100 by using a bus with various communication protocols. For example, the bus format may include one or more of various interface protocols such as a universal serial bus (USB), small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), etc.

The nonvolatile memory device 1220 may include the plurality of nonvolatile memories NVM1 to NVMn for storing data. For example, in the case where the nonvolatile memory device 1220 includes NAND flash memories, the nonvolatile memory device 1220 may include arrays of memory cells formed along a plurality of word lines and a plurality of bit lines.

However, the above example does not limit the inventive concepts. The nonvolatile memory device 1220 may include one or more of various nonvolatile memory devices such as an electrically erasable and programmable ROM (EEPROM), a NOR flash memory, a phase-change RAM (PRAM), a resistive RAM (ReRAM), a ferroelectric RAM (FRAM), a spin-torque magnetic RAM (STT-MRAM), and the like, according to some example embodiments. For better understanding, in the following description, it may be assumed that the nonvolatile memory device 1220 includes NAND flash memories. However, configurations of the nonvolatile memory device 1220 may be variously changed or modified, according to some example embodiments.

The buffer memory 1230 may store data to be used for an operation of the storage device 1200. The buffer memory 1230 may temporarily store data processed or to be processed by the processor 1211. For example, the buffer memory 1230 may store firmware loaded from the nonvolatile memory device 1220. For example, the buffer memory 1230 may include a volatile memory, such as a dynamic random access memory (DRAM), a synchronous DRAM (SDRAM), or the like, and/or a nonvolatile memory, such as a PRAM, a magneto-resistive RAM (MRAM), a ReRAM, an FRAM, or the like.

Figure 4:
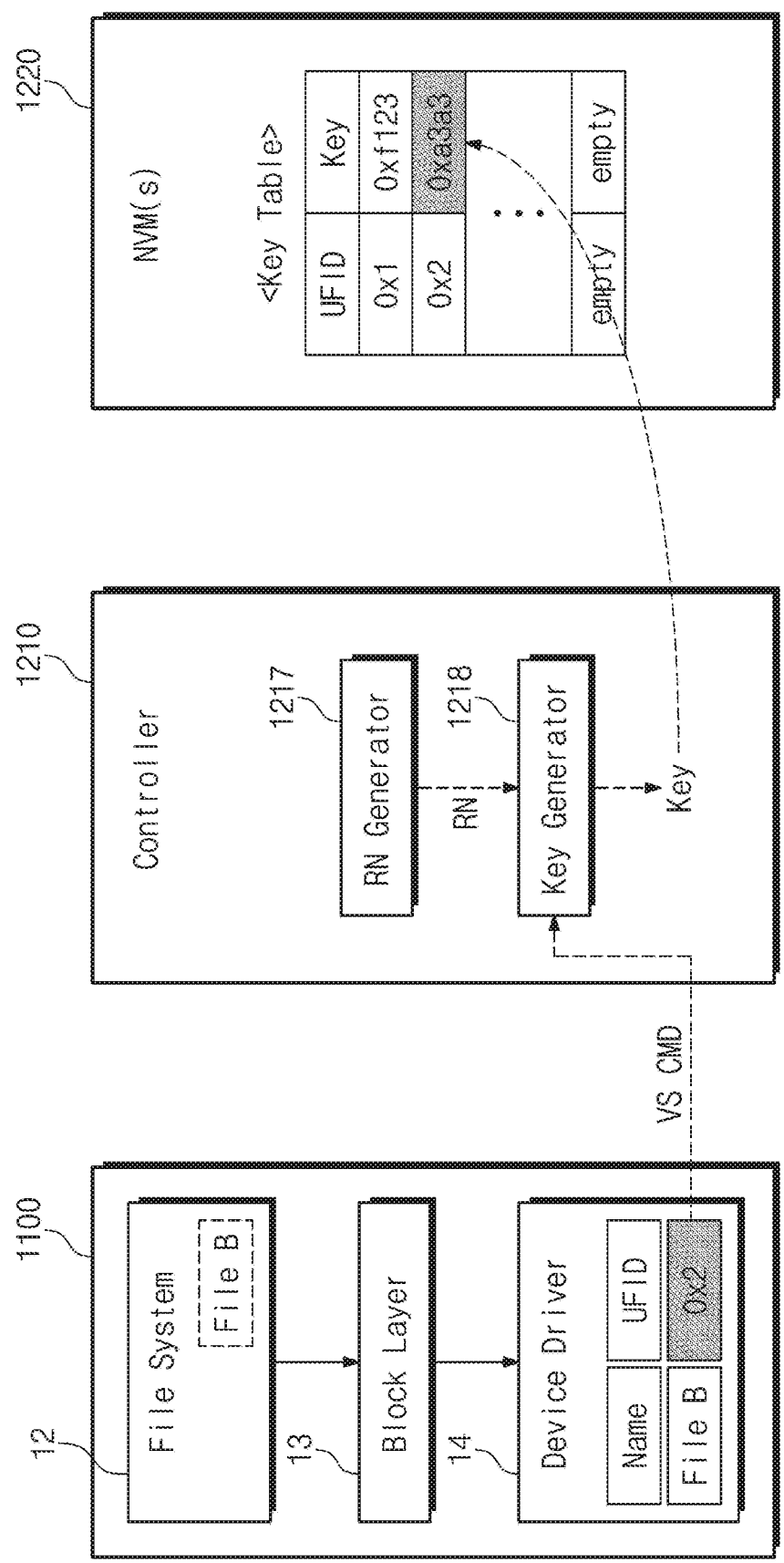
FIG. 4 is a block diagram illustrating an exemplary configuration of a storage system illustrated in FIG. 1.
Figure 5:
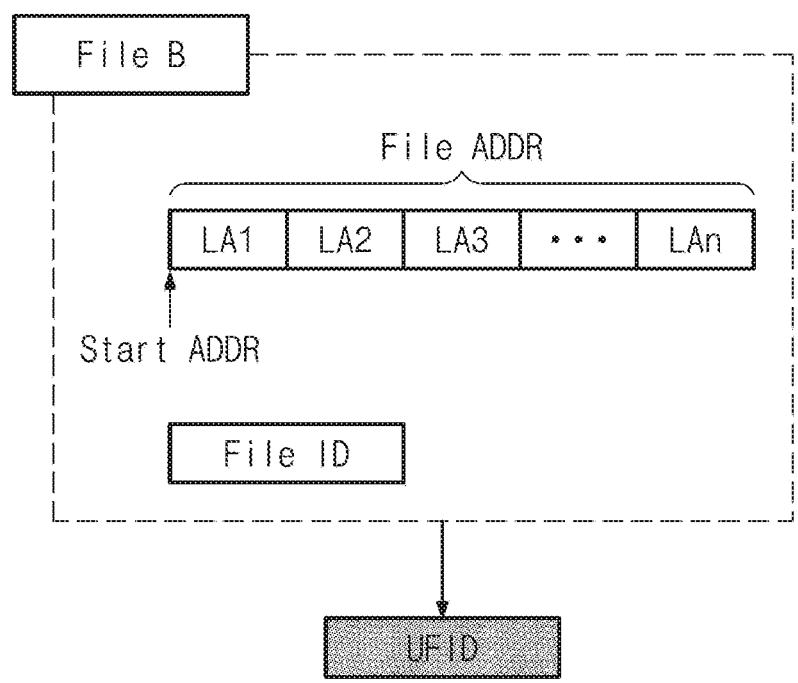
FIG. 5 is a view conceptually illustrating how a device driver generates a unique file ID by using an ID of a file and an address of the file.

FIG. 4 is a block diagram illustrating an exemplary configuration of the storage system 1000 illustrated in FIG. 1. FIG. 5 is a view conceptually illustrating how the device driver 14 generates the unique file ID UFID by using an ID of a file and an address of the file. How to generate the unique file ID UFID and how to generate and manage a key will be described with reference to FIGS. 4 and 5 together.

The file system 12 of the host device 1100 generates a file in response to a request of the user or the like. In an example embodiment, an example in which a file having a name of "File B" is generated is illustrated in FIG. 4. The device driver 14 may determine (or detect) whether a file is generated. For example, the device driver 14 may directly detect a file generated in the file system 12.

Alternatively or additionally, the device driver 14 may determine that the file is generated, by detecting a transaction between the file system 12 and the block layer 13 or detecting a transaction between the block layer 13 and the device driver 14. In this case, for the device driver 14 to detect file generation, filter drivers (not illustrated) may be provided between layers.

The device driver 14 may generate the unique file ID UFID based on an identifier ID and logical addresses LA1 to LAn of the generated file. For example, the identifier ID of the file may be a unique ID of the file assigned by the file system 12, and the logical addresses of the file may be addresses that are based on a sector and/or a cluster in the file system 12.

Since the unique file ID UFID generated by the device driver 14 is based on the identifier ID and logical addresses LA1 to LAn of the file, the unique file ID UFID is simple and also has a unique value distinguished from a unique file ID UFID of another file. For example, the unique file ID UFID may be, but is not limited to, a start address of a file in the file system 12. For example, the logical addresses LA1 to LAn may be discontinuous.

Meanwhile in the case where it is detected that a file is generated, the device driver 14 may transmit the unique file ID UFID to the controller 1210. For example, the device driver 14 may transmit the unique file ID UFID by using the vendor specific command VS CMD. For example, the unique file ID UFID may be added to a reserved field of the vendor specific command VS CMD so as to be transmitted to the controller 1210. However, some example embodiments the inventive concepts are not limited thereto.

The controller 1210 may be configured to generate a key needed to encrypt or decrypt data by using the unique file ID UFID. To this end, the controller 1210 may include a random number (RN) generator 1217 and a key generator 1218, which are implemented by hardware and/or software.

The random number generator 1217 may be configured to generate irregular numbers in which one specific value (e.g., "0" or "1") is not output continuously over a given length. For example, the random number generator 1217 may be implemented by using a ring oscillator or may be implemented by using meta-stability. However, some example embodiments of the inventive concepts are not limited thereto.

The key generator 1218 may be configured to generate a key needed to encrypt and/or decrypt data by using the unique file ID UFID and a random number (RN). Since the file generated by the file system 12 has a unique file ID and a unique file address, a key value generated by the key generator 1218 may also have a unique value that is distinguished from any other key value. The generated key value may be transmitted to the nonvolatile memory device 1220.

The nonvolatile memory device 1220 may store the key value received from the controller 1210. For example, the key value may be managed in a table in connection with the unique file ID UFID. For example, the key value may be stored in a secure area (e.g., a manager area, an over provisioning area, etc.) of the nonvolatile memory device 1220 different from an area where general user data are stored. Therefore, an unauthorized user cannot access the secure area of the nonvolatile memory device 1220 in which the key value is stored.

Figure 6:
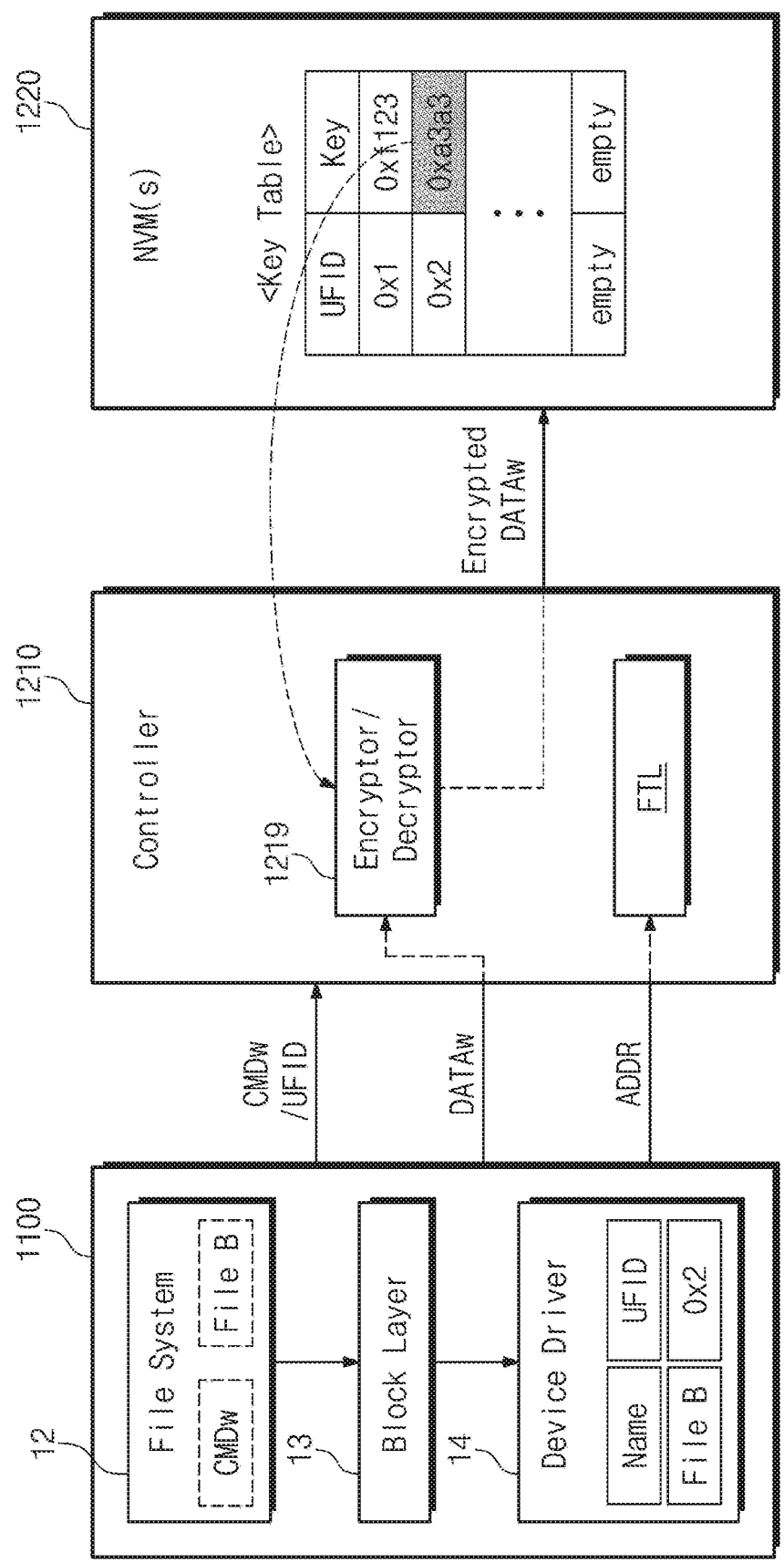
FIG. 6 is a block diagram illustrating an exemplary configuration of a storage system illustrated in FIG. 1.

FIG. 6 is a block diagram illustrating an exemplary configuration of the storage system 1000 illustrated in FIG. 1. An operation where a file generated by the file system 12 is stored in the storage device 1200 will be described with reference to FIG. 6.

In the case where a file (e.g., File B) is generated by the file system 12, the file system 12 may generate a write command CMDw in response to a request of the user. Here, the write command CMDw is a command for storing the file "B" in the nonvolatile memory device 1220, and the unique file ID UFID corresponds to the file "B". For example, the device driver 14 may transmit the write command CMDw and the unique file ID UFID to the controller 1210. Alternatively/additionally, a lower layer (e.g., a link layer, a transport layer, etc.) of the device driver 14 may packetize the write command CMDw and the unique file ID UFID and may transmit the packetized result to the controller 1210. However, some example embodiments of the inventive concepts are not limited thereto.

The file system 12 may transmit the address ADDR and write data DATAw to the controller 1210. For example, the address ADDR may be a logical address of a file generated by the file system 12, or may correspond to a logical address generated by the file system 12.

The controller 1210 may include an encryptor/decryptor 1219 and the flash translation layer FTL. For example, the encryptor/decryptor 1219 may be a function block (e.g., a cryptographic intellectual property (IP)) implemented with hardware, or may be implemented with software/firmware according to an encryption algorithm. However, some example embodiments of the inventive concepts are not limited thereto. The flash translation layer FTL may be stored in the nonvolatile memory device 1220, may be loaded to the buffer memory 1230 (refer to FIG. 3) upon booting the storage device 1200, and may be driven by the processor 1211 (refer to FIG. 3), for example.

The encryptor/decryptor 1219 may encrypt write data DATAw by using a key value stored in the nonvolatile memory device 1220. Prior to encryption, the controller 1210 may read a key value corresponding to the file "B" (or write data DATAw) from a table stored in the nonvolatile memory device 1220 in response to the write command CMDw.

The flash translation layer FTL maps the logical address ADDR received from the host device 1100 onto a physical address on the nonvolatile memory device 1220, at which encrypted write data DATAw will be stored. The controller 1210 may store the encrypted write data DATAw in an area of the nonvolatile memory device 1220 according to the mapping result of the flash translation layer FTL.

Figure 7:
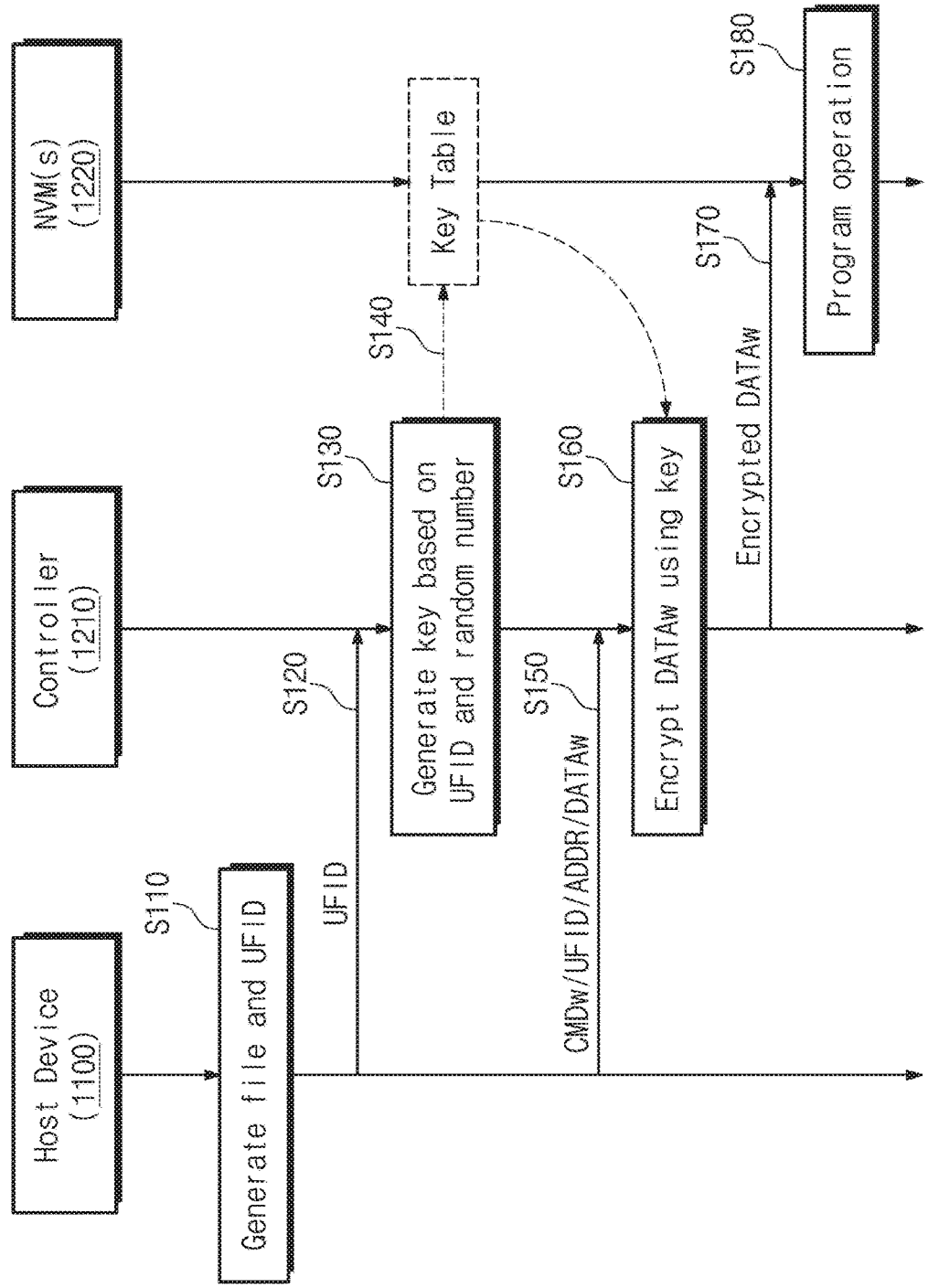
FIG. 7 is a flowchart illustrating an operation of a storage system according to some example embodiments of the inventive concepts.

FIG. 7 is a flowchart illustrating an operation of a storage system according to some example embodiments of the inventive concepts. For better understanding, a description will be given with reference to FIGS. 4 to 6 together.

In the case where a write request of the user is received, in operation S110, the file system 12 of the host device 1100 generates a file and an ID of the file. The device driver 14 detects that the file is generated, directly or by using filter layers provided between respective layers. The file system 12 generates the unique file ID UFID by using the ID of the file on the file system 12 and a logical address ADDR of the file. The unique file ID UFID is transmitted to the controller 1210 by using a vender specific command VS CMD (S120).

In operation S130, the controller 1210 may generate a key value needed to encrypt and/or decrypt data by using the unique file ID UFID and a random number. Since the unique file ID UFID is based on a unique ID and a unique address of the file, the key value has a unique value distinguished from any other file with regard to the file. The generated key value may be transmitted to the nonvolatile memory device 1220 and may be managed in a table in association with the unique file ID UFID (S140).

In operation S150, the host device 1100 may transmit a write command CMDw, the unique file ID UFID, the address ADDR, and the write data DATAw to the controller 1210 in response to a write request for the file. The address ADDR may be a logical address of the file generated by the file system 12 or may correspond to the logical address of the file, and the write data DATAw may be the file or may correspond to the file.

In operation S160, the controller 1210 may read the key value corresponding to the unique file ID UFID from the table stored in the nonvolatile memory device 1220, and may encrypt the write data DATAw by using the key value. The encrypted write data DATAw may be transmitted to the nonvolatile memory device 1220 (S170), and may be programmed on a physical area of the nonvolatile memory device 1220 according to an address mapping result of the flash translation layer FTL (S180).

According to the above-described operations, the unique file ID UFID of the file is generated based on the ID and address of the file. Even though the file has a plurality of logical addresses, since encryption is performed by using the one unique file ID UFID corresponding in common to the plurality of logical addresses, the size of the key value used for encryption may be reduced.

Figure 8:
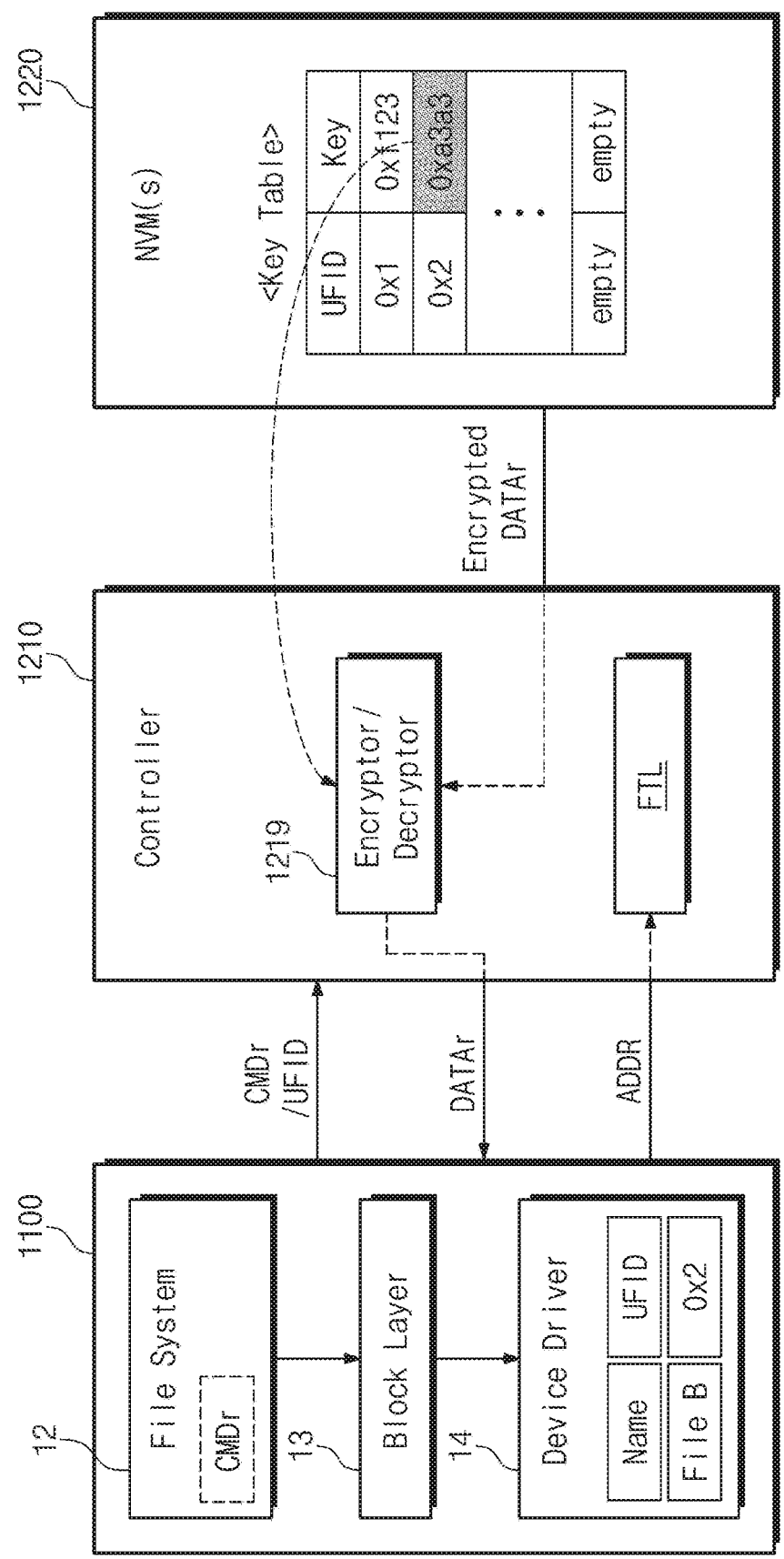
FIG. 8 is a block diagram illustrating an operation of a storage system according to some example embodiments of the inventive concepts.

FIG. 8 is a block diagram illustrating an operation of a storage system according to some example embodiments of the inventive concepts. A read operation and a decryption operation will be described with reference to FIG. 8.

In the case where a read request of the user is received, the file system 12 of the host device 1100 generates a read command CMDr.

The device driver 14 detects that the read command CMDr is generated. For example, the device driver 14 may detect that the read command CMDr is generated from the file system 12, directly or through filter layers (not illustrated) provided between respective layers. The device driver 14 transmits the read command CMDr, a unique file ID UFID corresponding to a file to be read, and a logical address ADDR corresponding to the file to be read to the controller 1210.

Upon receiving the read command CMDr, the controller 1210 reads encrypted data DATAr from the nonvolatile memory device 1220 based on a mapping result of the flash translation layer FTL.

In addition, the controller 1210 reads a key value, associated with the unique file ID UFID received together with the read command CMDr, from the table stored in the nonvolatile memory device 1220 in response to the read command CMDr. The encryptor/decryptor 1219 may decrypt the encrypted read data DATAr by using the read key value. The decrypted read data DATAr may then be transmitted to the host device 1100 upon being decrypted.

Figure 9:
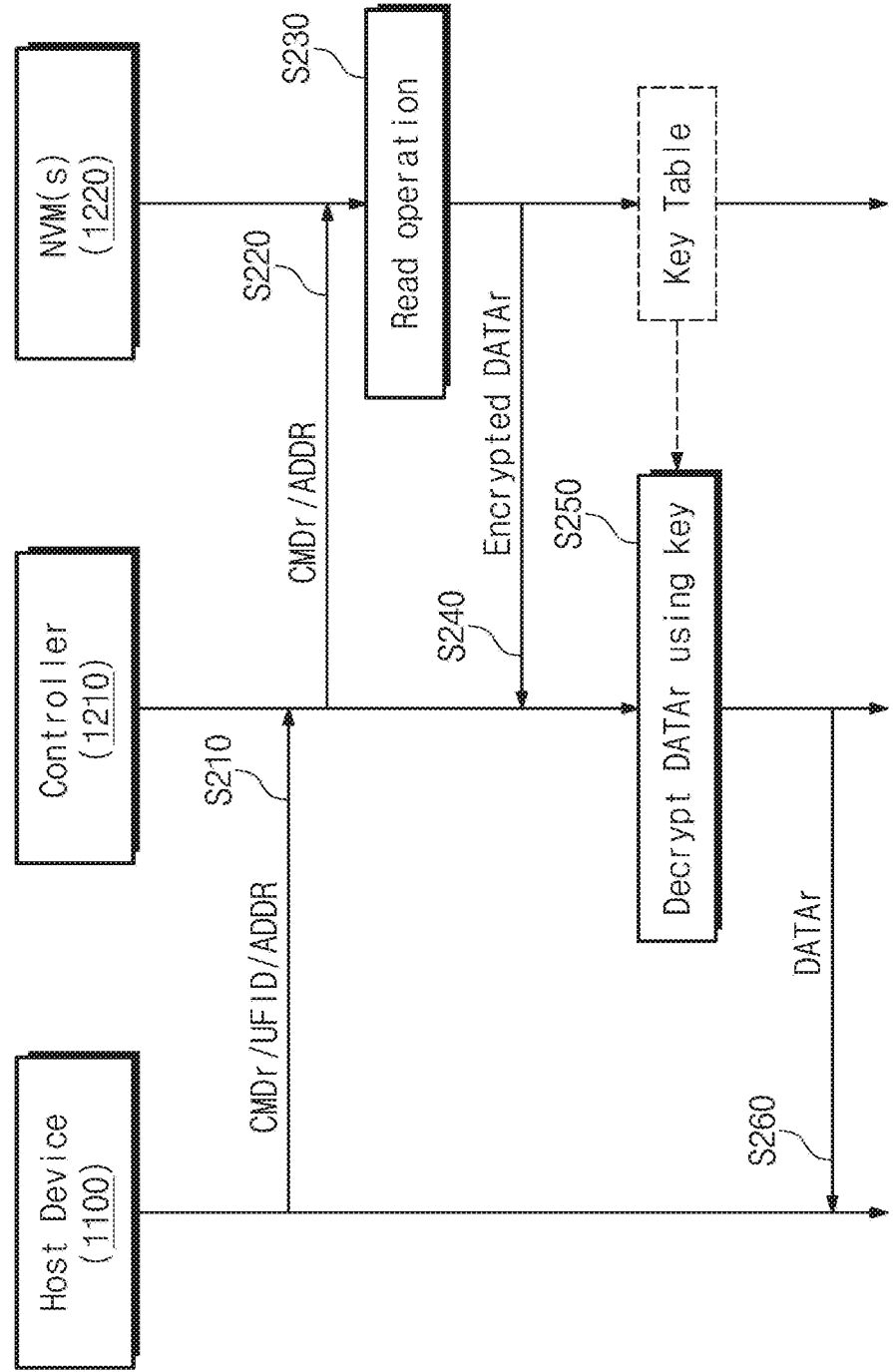
FIG. 9 is a flowchart illustrating an operation of a storage system according to some example embodiments of the inventive concepts.

FIG. 9 is a flowchart illustrating an operation of a storage system according to some example embodiments of the inventive concepts. For better understanding, a description will be given with reference to FIG. 8 together.

In operation S210, the read command CMDr, the unique file ID UFID, and the address ADDR may be transmitted to the controller 1210 according to a read request of the user. The unique file ID UFID corresponds to a file to be read, and the address ADDR corresponds to a logical address of the file to be read.

Upon the controller 1210 transmitting the read command CMDr and the address ADDR to the nonvolatile memory device 1220 (S220), a read operation may be performed on data to be read at the nonvolatile memory device 1220 (S230), and encrypted read data DATAr may be read by the controller 1210 (S240). An example is illustrated in FIG. 9 in which encrypted read data DATAr is loaded to the controller 1210, but, in detail, the encrypted read data DATAr may be loaded to the buffer memory 1230 (refer to FIG. 3), according to some example embodiments.

In operation S250, a decryption operation may be performed to decrypt the encrypted read data DATAr by using a key value. Then decrypted data may be transmitted to the host device 1100 as read data DATAr. An example is illustrated in FIG. 9 in which the key value is read from a key table stored in the nonvolatile memory device 1220 when the decryption operation is performed, but some example embodiments of the inventive concepts are not limited thereto. For example, the key value may be read at various time points, for example, at a time point when the encrypted data DATAr is read in operation S240.

Figure 10:
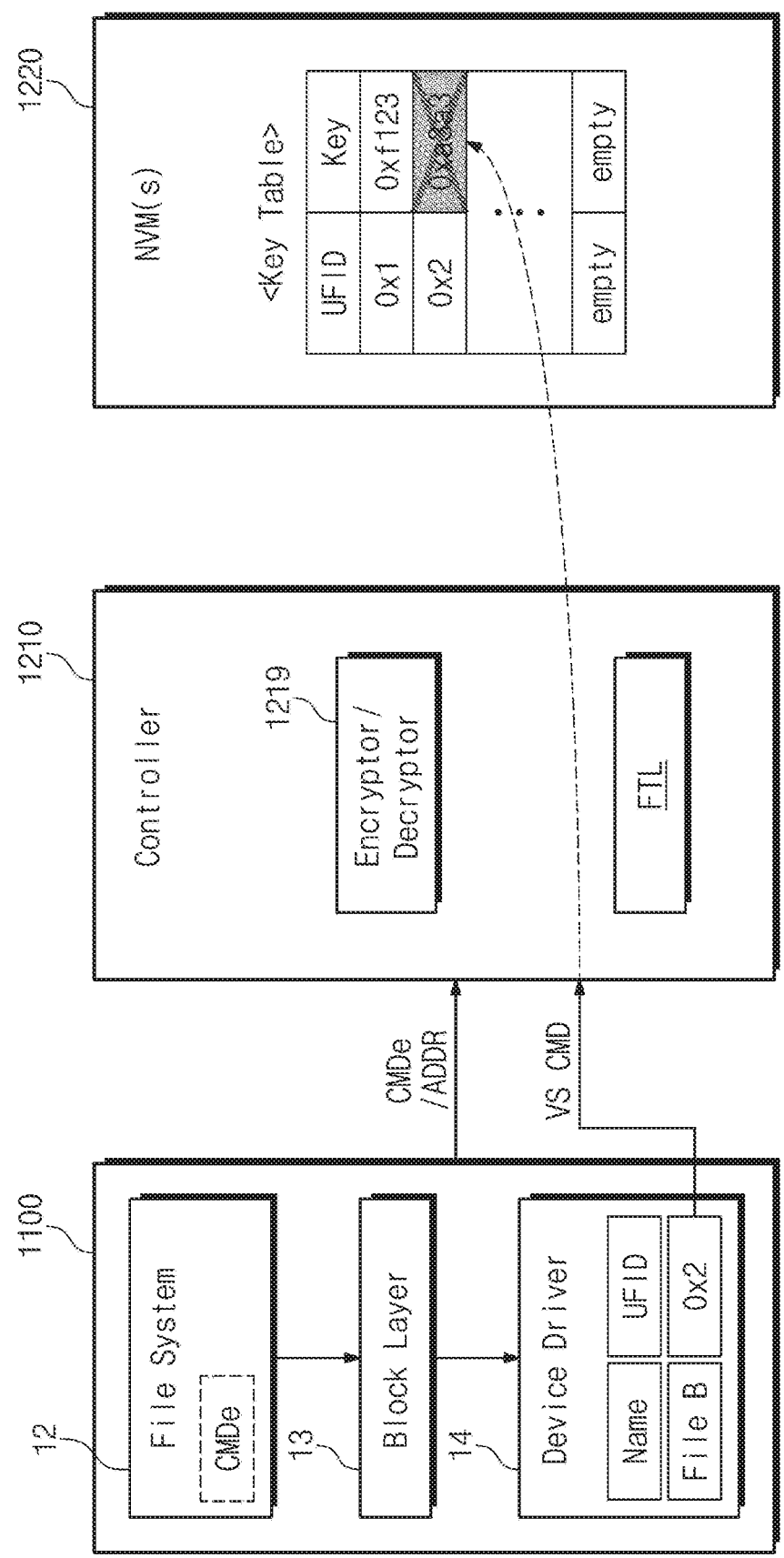
FIG. 10 is a block diagram illustrating an operation of a storage system according to some example embodiments of the inventive concepts.

FIG. 10 is a block diagram illustrating an operation of a storage system according to some example embodiments of the inventive concepts. An operation of deleting a file will be described with reference to FIG. 10.

In the case where a file delete request of the user is received, the file system 12 of the host device 1100 generates an erase command CMDe.

The device driver 14 detects that the erase command CMDe is generated. For example, the device driver 14 may detect that the erase command CMDe is generated from the file system 12, directly or through filter layers (not illustrated) provided between respective layers. The device driver 14 transmits the vendor specific command VS CMD and the unique file ID UFID of a file to be erased to the controller 1210.

Upon receiving the vendor specific command VS CMD and the unique file ID UFID, the controller 1210 may delete the key value associated with the unique file ID UFID corresponding to the file to be deleted from a key table stored in the nonvolatile memory device 1220, in response to the vendor specific command VS CMD. In this case, deleting the key value associated with the unique file ID UFID is a physical erase. Since the key value associated with the unique file ID UFID is physically erased, even though encrypted data corresponding to the unique file ID UFID may still be read, it is impossible to decrypt the encrypted data without the corresponding key value that has been physically erased.

After physically erasing the key value associated with the unique file ID UFID from the key table stored in the nonvolatile memory device 1220, the controller 1210 receives the erase command CMDe and the logical address ADDR from the host device 1100. The flash translation layer FTL releases a mapping relationship between the logical address ADDR of the file to be erased and a physical address at which encrypted data DATAw corresponding to the file to be erased is stored. That is, the file to be erased is logically erased from the nonvolatile memory device 1220 (e.g., the encrypted data DATAw corresponding to the file to be erased becomes invalid data upon the key value associated with the unique file ID UFID being physically erased from the key table). Afterwards, in the event that a storage space of the nonvolatile memory device 1220 is insufficient (e.g., when an amount of available storage space drops below a predetermined and/or a desired threshold), the controller 1210 may perform garbage collection and/or a physical erase operation (e.g., sanitize) on an area of the nonvolatile memory device 1220 where the logically erased data (e.g., the encrypted data DATAw which has become invalid data due to the key value associated with the unique file ID UFID being physically erased) is stored, in order to free up some additional storage space in the nonvolatile memory device 1220.

Figure 11:
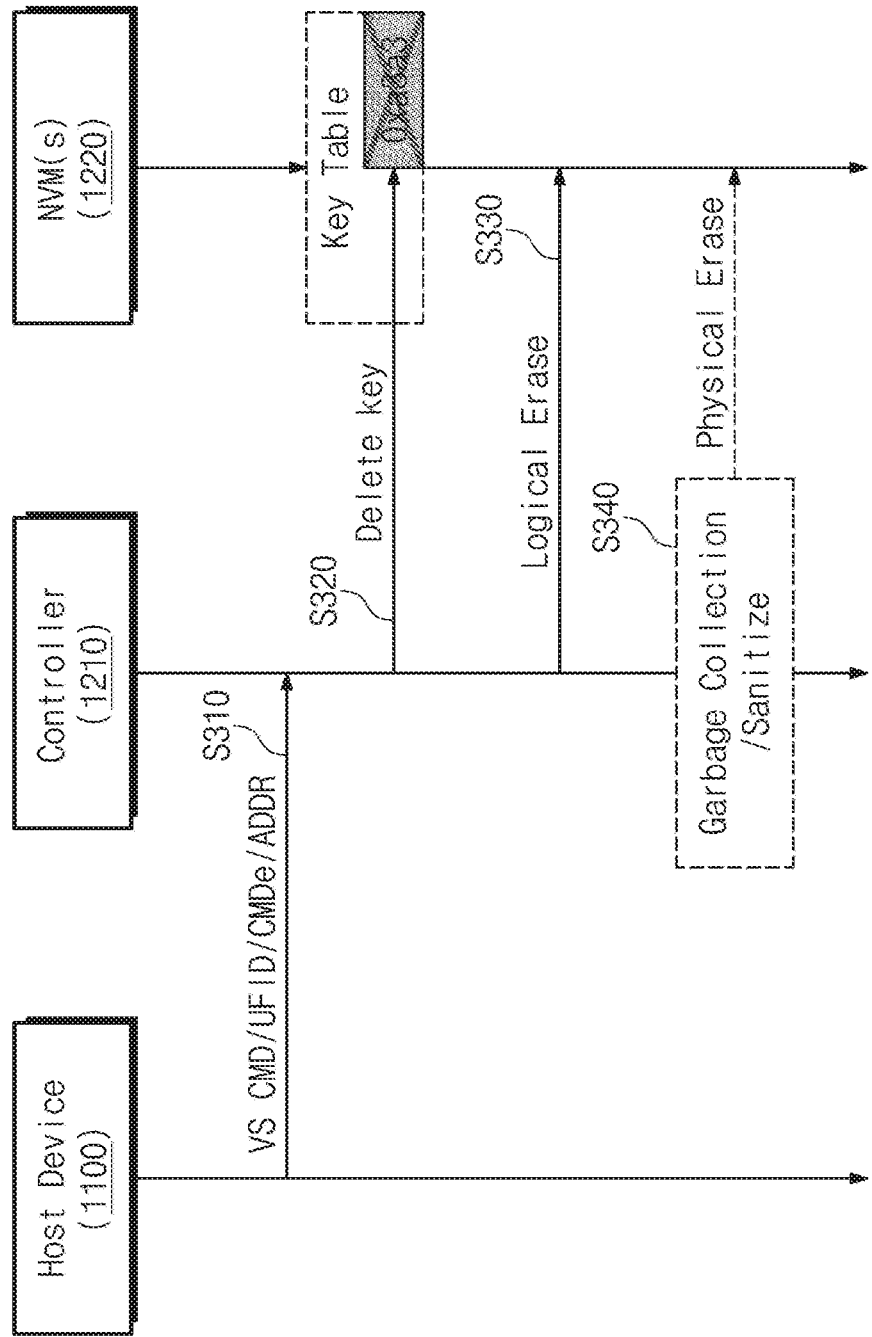
FIG. 11 is a flowchart illustrating an operation of a storage system according to some example embodiments of the inventive concepts.

FIG. 11 is a flowchart illustrating an operation of a storage system according to some example embodiments of the inventive concepts. For better understanding, a description will be given with reference to FIG. 10 together.

In operation S310, the erase command CMDe for a file, the unique file ID UFID of an erase-requested file, and the logical address ADDR of the erase-requested file are transmitted to the controller 1210 by the host device 1100. For example, the unique file ID UFID may be transmitted to the controller 1210 through the vendor specific command VS CMD. Alternatively, unlike the illustration of FIG. 11, after the unique file ID UFID is first transmitted to the controller 1210, and a key value corresponding to the unique file ID UFID is physically erased from the key table stored in the nonvolatile memory device 1220, the erase command CMDe may then be transmitted to the controller 1210 by the host device 1100, according to some example embodiments.

In operation S320, the controller 1210 may physically erase the key value corresponding to the unique file ID UFID from the key table stored in the nonvolatile memory device 1220.

In operation S330, the controller 1210 may release a mapping relationship between the logical address ADDR corresponding to the erase-requested file (encrypted DATAw) and a physical address of the erase-requested file. That is, the erase-requested file (encrypted DATAw) is logically erased.

In the case where a storage space of the nonvolatile memory device 1220 is insufficient (e.g., in response to an amount of available storage space being below a predetermined and/or a desired threshold), in operation S340, the controller 1210 may perform garbage collection and/or a physical erase operation (e.g., sanitize) on the nonvolatile memory device 1220 for the purpose of securing the storage space of the nonvolatile memory device 1220. As a result, the logically erased data (e.g., the encrypted DATAw that has become invalid data) is physically erased from the nonvolatile memory device 1220, in order to free up some additional storage space in the nonvolatile memory device 1220.

In general, even though a file erase operation is requested, a substantial period of time may occur between a time point at which data is logically erased and a time point at which the data is physically erased. However, according to some example embodiments of the inventive concepts, since data is encrypted by using the unique file ID UFID generated for each file, the size of a key value used for encryption and/or decryption may be reduced. In addition, when a file delete operation is requested, the level of security may be increased because the key value associated with the unique file ID UFID corresponding to the delete-requested file is physically erased.

Figure 12:
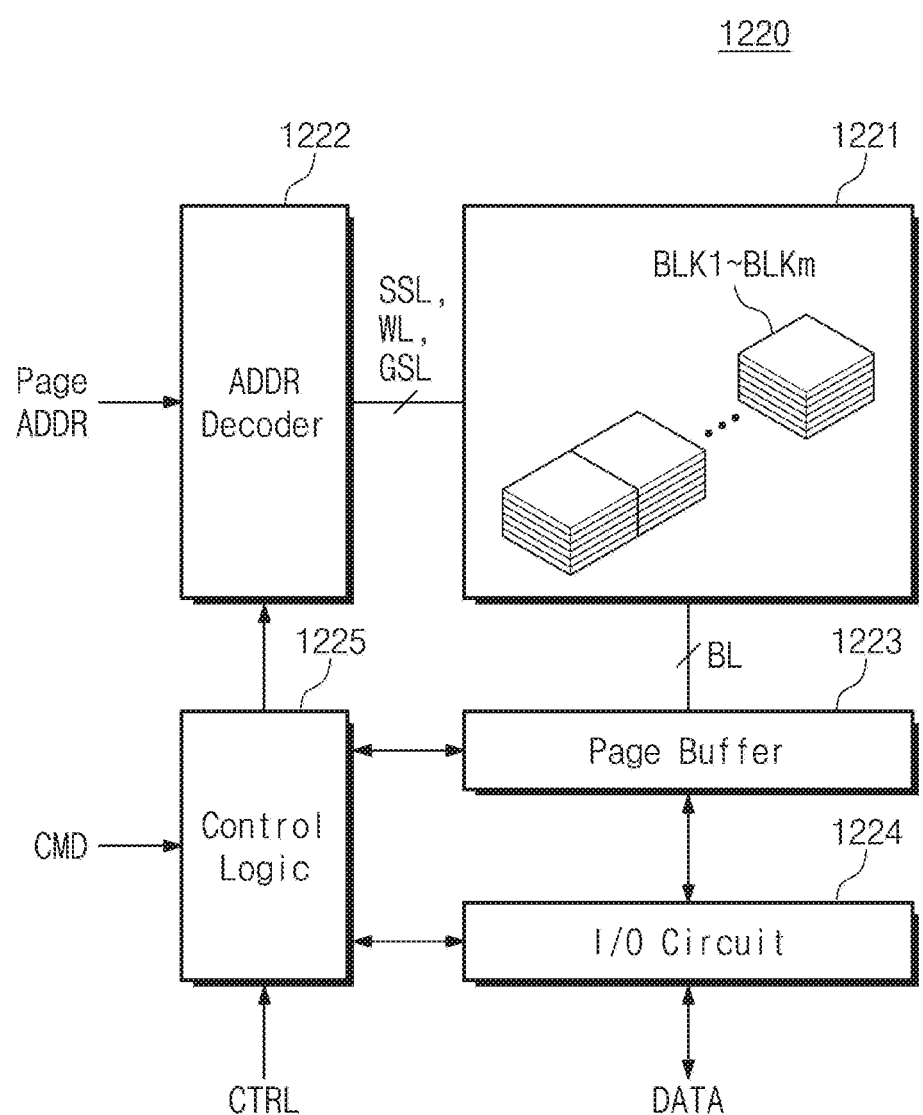
FIG. 12 is a block diagram illustrating an exemplary configuration of a nonvolatile memory device described with reference to FIGS. 3 to 10.

FIG. 12 is a block diagram illustrating an exemplary configuration of the nonvolatile memory device 1220 described with reference to FIGS. 3 to 10. The nonvolatile memory device 1220 may include a memory cell array 1221, an address (ADDR) decoder 1222, a page buffer 1223, an input/output (I/O) circuit 1224, and control logic 1225.

The memory cell array 1221 may include a plurality of memory blocks BLK1~BLKm. Each of the memory blocks BLK1~BLKm may include a plurality of cell strings. Each of the cell strings may include a plurality of memory cells. The plurality of memory cells may be connected with a plurality of word lines WL. Each memory cell may be a single level cell (SLC) storing one bit or a multi-level cell (MLC) storing at least two bits.

The address decoder 1222 is connected with the memory cell array 1221 through the plurality of word lines WL, string selection lines SSL, and ground selection lines GSL. The address decoder 1222 may receive a logical address from the outside and may decode the received logical address to drive the plurality of word lines WL. For example, an address ADDR may be a physical address of the nonvolatile memory device 1220 that is obtained by translating a logical address. The above-described address translation operation may be performed by the flash translation layer FTL driven by the controller 1210 (refer to FIG. 3).

The page buffer 1223 is connected with the memory cell array 1221 through a plurality of bit lines BL. Under control of the control logic 1225, the page buffer 1223 may control the bit lines BL such that data "DATA" received from the input/output circuit 1224 is stored in the memory cell array 1221. Under control of the control logic 1225, the page buffer 1223 may read data stored in the memory cell array 1221 and may provide the read data to the input/output circuit 1224. In some example embodiments, the page buffer 1223 may receive data from the input/output circuit 1224 by the page and/or may read data from the memory cell array 1221 by the page.

The input/output circuit 1224 may receive the data "DATA" from an external device and may provide the received data to the page buffer 1223.

The control logic 1225 may control the address decoder 1222, the page buffer 1223, and the input/output circuit 1224 in response to a command CMD and a control signal CTRL received from the outside. For example, the control logic 1225 may control other components in response to the command CMD and the control signal CTRL such that the data "DATA" is stored in the memory cell array 1221. Alternatively, the control logic 1225 may control other components in response to the command CMD and the control signal CTRL such that the data "DATA" stored in the memory cell array 1221 is transmitted to the external device. The control signal CTRL may be a signal that the controller 1210 (refer to FIG. 3) provides to control the nonvolatile memory device 1220.

The control logic 1225 may generate various voltages needed for the nonvolatile memory device 1220 to operate. For example, the control logic 1225 may generate a plurality of program voltages, a plurality of pass voltages, a plurality of selection read voltages, a plurality of non-selection read voltages, a plurality of erase voltages, a plurality of verification voltages, and the like. The control logic 1225 may provide the generated voltages to the address decoder 1222 or to a substrate of the memory cell array 1221.

Figure 13:
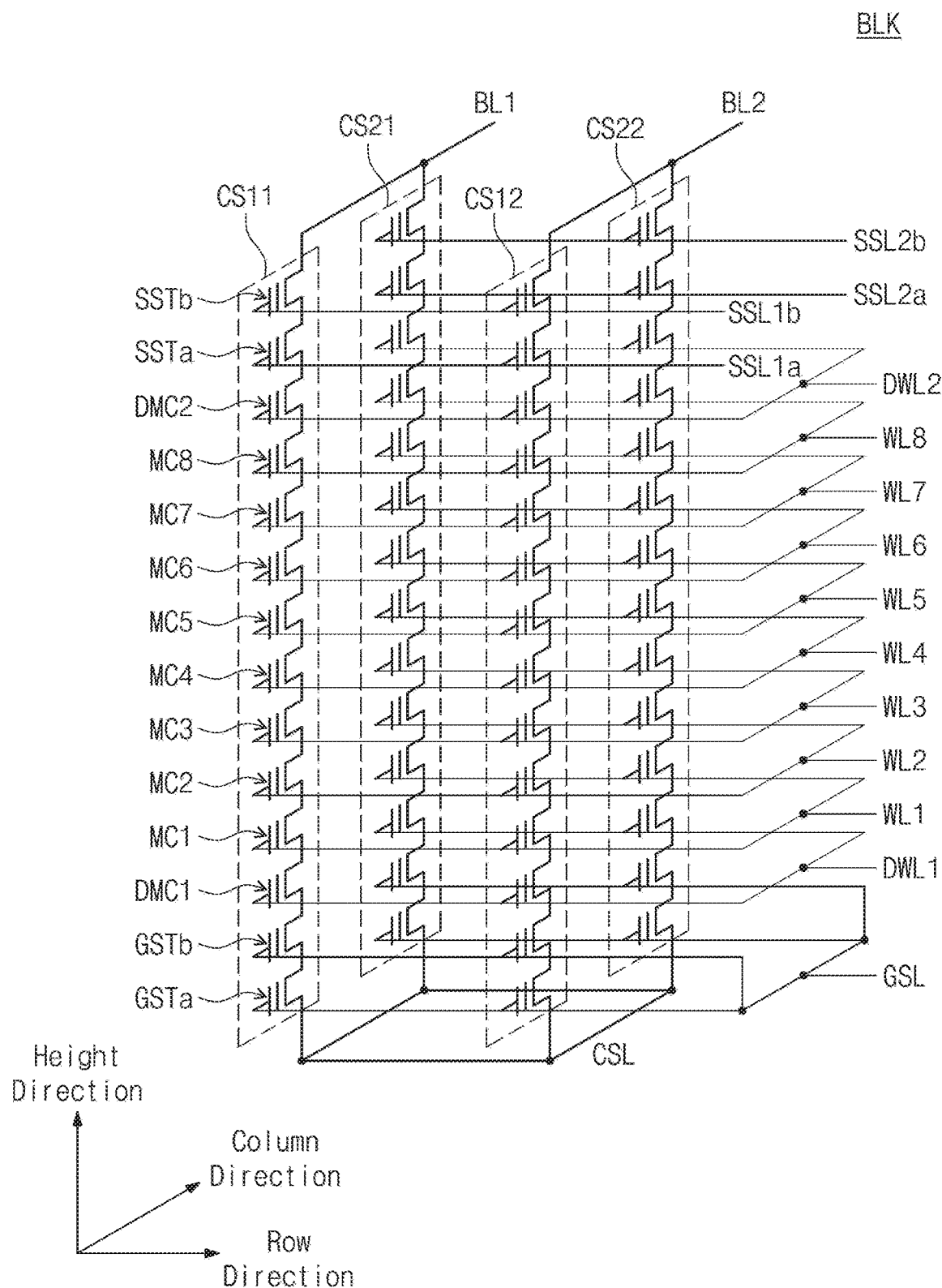
FIG. 13 is a circuit diagram illustrating an example of any one of memory blocks included in a memory cell array of FIG. 12.

FIG. 13 is a circuit diagram illustrating an example of any one of a plurality of memory blocks included in a memory cell array of FIG. 12. Referring to FIG. 13, a memory block BLK may include a plurality of cell strings CS11, CS12, CS21, and CS22. The plurality of cell strings CS11, CS12, CS21, and CS22 may be arranged along a row direction and a column direction to form rows and columns.

For example, the cell strings CS11 and CS12 may be connected to string selection lines SSL1a and SSL1b to constitute a first row. The cell strings CS21 and CS22 may be connected to string selection lines SSL2a and SSL2b to constitute a second row. For example, the cell strings CS11 and CS21 may be connected to a first bit line BL1 to constitute a first column. The cell strings CS12 and CS22 may be connected to a second bit line BL2 to constitute a second column.

Each of the plurality of cell strings CS11, CS12, CS21, and CS22 includes a plurality of cell transistors. For example, each of the plurality of cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In some example embodiments, each of the plurality of cell transistors included in the cell strings CS11, CS12, CS21, and CS22 may be a charge trap flash (CTF) memory cell.

In each cell string, the memory cells MC1 to MC8 may be serially connected and may be stacked in a height direction, the height direction being a direction perpendicular to a plane defined by the row direction and the column direction. In each cell string, the string selection transistors SSTa and SSTb may be serially connected, and the serially connected string selection transistors SSTa and SSTb may be interposed between the memory cells MC1 to MC8 and a bit line BL1 or BL2. In each cell string, the ground selection transistors GSTa and GSTb may be serially connected, and the serially connected ground selection transistors GSTa and GSTb may be interposed between the memory cells MC1 to MC8 and a common source line CSL.

In some example embodiments, in each cell string, a first dummy memory cell DMC1 may be interposed between the memory cells MC1 to MC8 and the ground selection transistors GSTa and GSTb. In some example embodiments, in each cell string, a second dummy memory cell DMC2 may be interposed between the memory cells MC1 to MC8 and the string selection transistors SSTa and SSTb.

The ground selection transistors GSTa and GSTb of the cell strings CS11, CS12, CS21, and CS22 may be connected in common to a ground selection line GSL. In some example embodiments, ground selection transistors in the same row may be connected to the same ground selection line, and ground selection transistors in different rows may be connected to different ground selection lines. For example, the first ground selection transistors GSTa of the cell strings CS11 and CS12 in the first row may be connected to a first ground selection line, and the first ground selection transistors GSTa of the cell strings CS21 and CS22 in the second row may be connected to a second ground selection line.

In some example embodiments, even though not illustrated in FIG. 13, ground selection transistors provided at the same height from a substrate (not illustrated) may be connected to the same ground selection line, and ground selection transistors provided at different heights may be connected to different ground selection lines. For example, in the cell strings CS11, CS12, CS21, and CS22, the first ground selection transistors GSTa may be connected to the first ground selection line, and the second ground selection transistors GSTb may be connected to the second ground selection line.

Memory cells of the same height from the substrate (or the ground selection transistors GSTa and GSTb) may be connected in common to the same word line, and memory cells of different heights therefrom may be connected to different word lines. For example, the memory cells MC1 to MC8 of the cell strings CS11, CS12, CS21, and CS22 may be connected to first to eighth word lines WL1 to WL8.

String selection transistors, which belong to the same row, from among the first string selection transistors SSTa of the same height may be connected to the same string selection line, and string selection transistors, which belong to different rows, from among the first string selection transistors SSTa may be connected to different string selection lines. For example, the first string selection transistors SSTa of the cell strings CS11 and CS12 in the first row may be connected in common to the string selection line SSL1a, and the first string selection transistors SSTa of the cell strings CS21 and CS22 in the second row may be connected in common to the string selection line SSL2a.

Likewise, string selection transistors, which belong to the same row, from among the second string selection transistors SSTb of the same height may be connected to the same string selection line, and string selection transistors, which belong to different rows, from among the second string selection transistors SSTb may be connected to different string selection lines. For example, the second string selection transistors SSTb of the cell strings CS11 and CS12 in the first row may be connected in common to the string selection line SSL1b, and the second string selection transistors SSTb of the cell strings CS21 and CS22 in the second row may be connected in common to the string selection line SSL2b.

In some example embodiments, even though not illustrated in FIG. 13, string selection transistors of cell strings in the same row may be connected in common to the same string selection line. For example, the first and second string selection transistors SSTa and SSTb of the cell strings CS11 and CS12 in the first row may be connected in common to the same string selection line, and the first and second string selection transistors SSTa and SSTb of the cell strings CS21 and CS22 in the second row may be connected in common to the same string selection line.

In some example embodiments, dummy memory cells at the same height are connected with the same dummy word line, and dummy memory cells at different heights are connected with different dummy word lines. For example, the first dummy memory cells DMC1 are connected to a first dummy word line DWL1, and the second dummy memory cells DMC2 are connected to a second dummy word line DWL2.

In the memory block BLK, read and write operations may be performed for each row. For example, one row of the memory block BLK may be selected by the string selection lines SSL1a, SSL1b, SSL2a, and SSL2b.

For example, the cell strings CS11 and CS12 in the first row are respectively connected to the bit lines BL1 and BL2 when a turn-on voltage is supplied to the string selection lines SSL1a and SSL1b and a turn-off voltage is supplied to the string selection lines SSL2a and SSL2b. The cell strings CS21 and CS22 in the second row are respectively connected to the bit lines BL1 and BL2 when the turn-on voltage is supplied to the string selection lines SSL2a and SSL2b and the turn-off voltage is supplied to the string selection lines SSL1a and SSL1b. As a word line is driven, memory cells, which are arranged at the same height, from among memory cells of cell strings connected to the driven word line may be selected. Read and write operations may be performed with respect to the selected memory cells. The selected memory cells may constitute a physical page unit.

In the memory block BLK, an erase operation may be performed for each memory block and/or for each sub-block. When an erase operation is performed for each memory block, all memory cells MC (e.g., MC1 to MC8) in the memory block BLK may be simultaneously erased in response to one erase request. When the erase operation is performed for each sub-block, some of the memory cells MC in the memory block BLK may be simultaneously erased in response to one erase request, and the remaining memory cells MC thereof may be erase-inhibited. A low voltage (e.g., a ground voltage) may be supplied to a word line connected to the memory cells MC to be erased, and a word line connected to the remaining erase-inhibited memory cells MC may be floated, for example.

The memory block BLK illustrated in FIG. 13 is only a non-limiting example embodiment. In some example embodiments, the number of cell strings may increase or decrease, and/or the number of rows of cell strings and/or the number of columns of cell strings may increase or decrease depending on the number of cell strings. Also, in the memory block BLK, the number of cell transistors (GST, MC, DMC, SST, etc.) may increase or decrease, and/or a height of the memory block BLK may increase or decrease depending on the number of cell transistors (GST, MC, DMC, SST, etc.). Furthermore, the number of lines (GSL, WL, DWL, SSL, etc.) connected with cell transistors may increase or decrease depending on the number of cell transistors.

Figure 14:
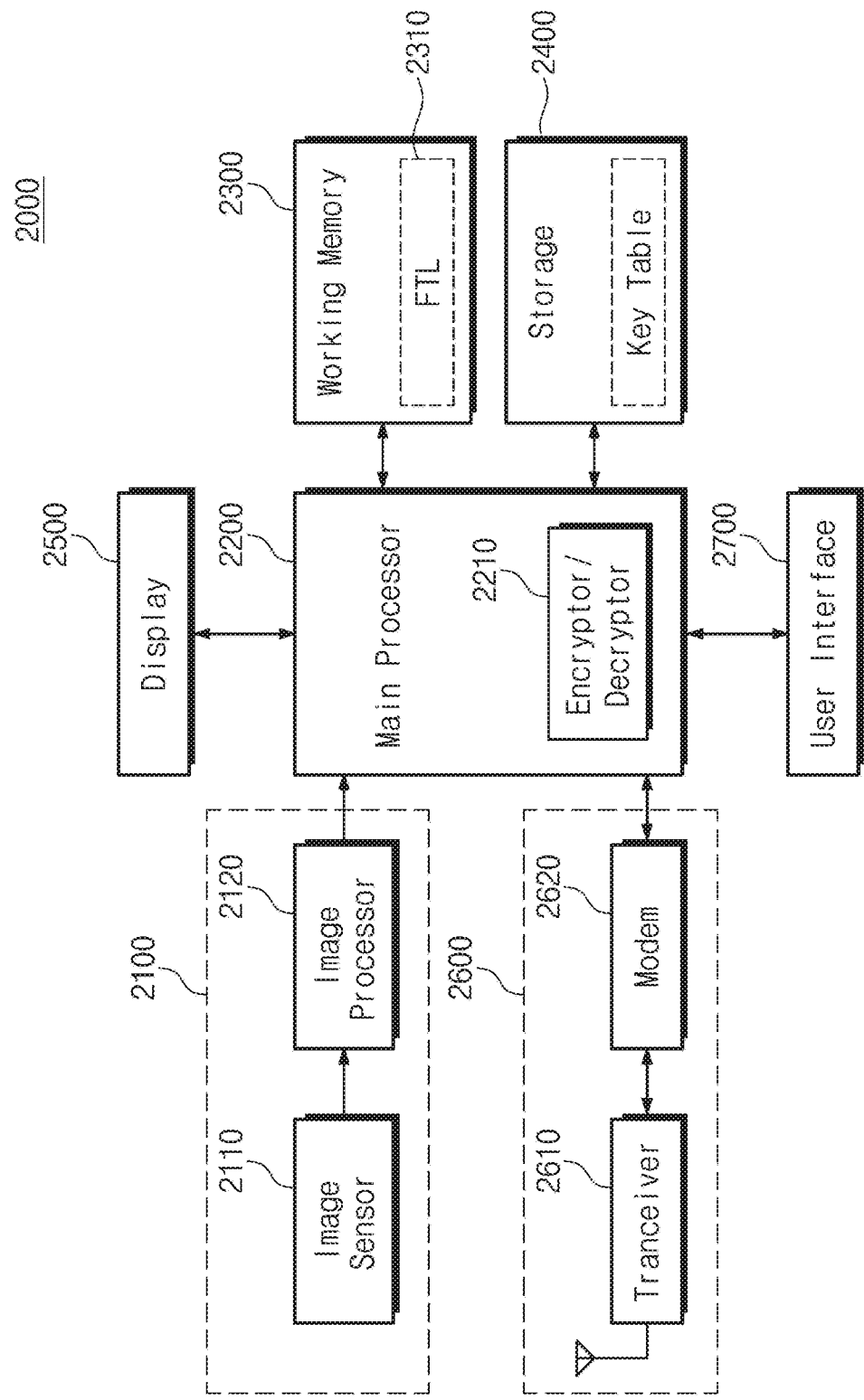
FIG. 14 is a block diagram illustrating an electronic device to which a storage system according to some example embodiments of the inventive concepts is applied.

FIG. 14 is a block diagram illustrating an electronic device to which a storage system according to some example embodiments of the inventive concepts is applied. For example, an electronic device 2000 may be implemented with a smartphone, a tablet computer, a desktop computer, a laptop computer, or a wearable device.

The electronic device 2000 may include an image processing device 2100, a main processor 2200, a working memory 2300, a storage 2400, a display 2500, a communication block 2600, and a user interface 2700.

The image processing device 2100 may include an image sensor 2110 for photographing an image and an image processor 2120 for processing the photographed image.

The main processor 2200 may control overall operations of the electronic device 2000. The main processor 2200 may drive an operating system OS that is based on a file system. In particular, the main processor 2200 may generate the unique file identifier (UFID) that is based on an ID and an address of a file. In addition, the main processor 2200 may include an encryptor/decryptor 2210 configured to encrypt and/or decrypt data based on the unique file ID UFID. Additionally/alternatively, the encryptor/decryptor 2210 may be software and/or firmware that is/are driven on the working memory 2300.

The working memory 2300 may store data to be used for an operation of the electronic device 2000. For example, the flash translation layer FTL that defines a mapping relationship between logical addresses and physical addresses of data stored in the storage 2400 may be loaded to the working memory 2300. For example, the working memory 2300 may include a volatile memory, such as a dynamic random access memory (DRAM) a synchronous DRAM (SDRAM), or the like, and/or a nonvolatile memory, such as a phase-change RAM (PRAM), a magneto-resistive RAM (MRAM), a resistive RAM (ReRAM), a ferroelectric RAM (FRAM), or the like.

The storage 2400 may store a key value needed to encrypt and/or decrypt data. For example, the key value may be stored in a secure area of the storage 2400 that is different from an area where general data are stored. For example, the secure area where the key value is stored may be an area that is impossible for the user (and/or an unauthorized user) to access. The storage 2400 may include a nonvolatile memory such as a flash memory, a PRAM, a MRAM, a ReRAM, a FRAM, or the like.

The display 2500 may include a display panel and a display serial interface (DSI) peripheral circuit (not illustrated). For example, the display panel may be implemented with various devices such as a liquid crystal display (LCD) device, a light emitting diode (LED) display device, an organic LED (OLED) display device, an active matrix OLED (AMOLED) display device, and the like. A DSI host (not illustrated) embedded in the main processor 2200 may perform serial communication with the display panel through a DSI. The DSI peripheral circuit may include a timing controller, a source driver, and the like, for driving the display panel.

The communication block 2600 may exchange signals with an external device/system (not illustrated) through an antenna. A transceiver 2610 and a modulator/demodulator (modem) 2620 of the communication block 2600 may process signals exchanged with the external device/system, in compliance with a wireless communication protocol such as long term evolution (LTE), worldwide interoperability for microwave access (WiMax), global system for mobile communication (GSM), code division multiple access (CDMA), Bluetooth, near field communication (NFC), wireless fidelity (Wi-Fi), or radio frequency identification (RFID), for example.

The user interface 2700 may include at least one of input interfaces such as a keyboard, a mouse, a keypad, a button, a touch panel, a touch screen, a touch pad, a touch ball, a gyroscope sensor, a vibration sensor, an acceleration sensor, and the like.

Components of the electronic device 2000 may exchange data based on one or more of various interface protocols such as a universal serial bus (USB), a small computer system interface (SCSI), peripheral component interconnect express (PCIe), mobile PCIe (M-PCIe), advanced technology attachment (ATA), parallel ATA (PATA), serial ATA (SATA), a serial attached SCSI (SAS), integrated drive electronics (IDE), enhanced IDE (EIDE), nonvolatile memory express (NVMe), universal flash storage (UFS), and the like.

According to some example embodiments, a key size may be reduced while maintaining a required (and/or desired) level of security by generating an encryption key for each file in a file unit.

According to some example embodiments, since an encryption key is managed for each file, the complexity of key management may be reduced without reducing the level of security.

Various units and/or devices described above according to one or more example embodiments may be implemented using hardware, a combination of hardware and software, or storage media storing software. Hardware may be implemented using processing circuity such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of some example embodiments.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. A storage system comprising:
   a host device including a processor configured to cause the host device to,
      generate a file, and
      generate a unique file identifier (UFID) for each file, wherein the UFID is based on an identifier of the generated file and at least one logical address corresponding to the generated file; and
   a storage device including,
      a controller configured to cause the storage device to,
         generate a key for encrypting or decrypting write data corresponding to the generated file based on the UFID and a random number, and
         encrypt the write data by using the key.

2. The storage system of claim 1, wherein the storage device includes:
   a controller configured to generate the key based on the UFID and the random number, and to encrypt the write data by using the key; and
   a nonvolatile memory device configured to store the key in association with the UFID, and to store the encrypted write data.

3. The storage system of claim 1, wherein the processor is further configured to cause the host device to:
   generate a write command according to a write request associated with the generated file; and
   transmit the write command, the UFID, and the write data to the storage device.

4. The storage system of claim 1, wherein the UFID is based on a start address on a file system associated with the generated file.

5. The storage system of claim 1, wherein the processor is further configured to cause the host device to transmit the UFID to the storage device by using a vendor specific command.

6. The storage system of claim 2, wherein the processor is further configured to cause the host device to:
generate a read command according to a read request associated with the generated file; and
transmit the read command and the UFID to the storage device.

7. The storage system of claim 6, wherein the controller is further configured to cause the storage device to:
decrypt the encrypted write data stored in the nonvolatile memory device by using the key stored in the nonvolatile memory device in association with the UFID.

8. The storage system of claim 2, wherein
the processor is further configured to cause the host device to,
generate an erase command, and
transmit the UFID to the controller using a vendor specific command, according to a delete request associated with the generated file, and the controller is further configured to cause the storage device to,
physically erase the key stored in the nonvolatile memory device in association with the UFID, in response to the vendor specific command.

9. The storage system of claim 8, wherein
the processor is further configured to cause the host device to,
transmit the erase command and a logical address of the at least one logical address corresponding to the generated file to the controller according to the delete request associated with the generated file, and
the controller is further configured to cause the storage device to,
release a mapping relationship between the logical address and a physical address at which the encrypted write data corresponding to the generated file is stored, in response to the erase command, such that the encrypted write data stored at the physical address becomes invalid data, and
perform a garbage collection operation on the nonvolatile memory device to physically erase the invalid data that is stored in the nonvolatile memory device, and corresponds to the delete request.

10. The storage system of claim 2, wherein the nonvolatile memory device includes:
a memory cell array including a plurality of memory cells that are formed to be perpendicular to a substrate and are connected to a plurality of word lines and a plurality of bit lines; and
a page buffer configured to store data read from the memory cell array,
wherein a plurality of cell strings, each of which includes serially connected memory cells among the plurality of memory cells, are connected in common to a same bit line of the plurality of bit lines.

11. A storage device comprising:
a controller configured to cause the storage device to generate an encryption key by using a unique file identifier (UFID), which is generated for each file based on an identifier of a file generated on a file system and at least one logical address corresponding to the generated file; and
a nonvolatile memory device configured to store the encryption key in association with the UFID.

12. The storage device of claim 11, wherein the controller is further configured to cause the storage device to:
encrypt write data corresponding to the generated file by using the encryption key stored in the nonvolatile memory device in association with the UFID, in response to a write command; and
store the encrypted write data in the nonvolatile memory device.

13. The storage device of claim 12, wherein the controller is further configured to cause device to:
decrypt the encrypted write data by using the encryption key stored in the nonvolatile memory device in association with the UFID, in response to a read command.

14. The storage device of claim 11, wherein the controller is further configured to cause the storage device to physically erase the encryption key stored in the nonvolatile memory device in association with the UFID, in response to an erase command.

15. The storage device of claim 11, wherein the nonvolatile memory device includes:
a memory cell array including a plurality of memory cells that are formed to be perpendicular to a substrate and are connected to a plurality of word lines and a plurality of bit lines; and
a page buffer configured to store data read from the memory cell array,
wherein a plurality of cell strings, each of which includes serially connected memory cells among the plurality of memory cells, are connected in common to a same bit line of the plurality of bit lines.

16. A method of operation of a storage system, which includes a host device and a storage device, the method comprising:
generating a file;
generating a unique file identifier (UFID) for each file, based on an identifier of the generated file and at least one logical address corresponding to the generated file;
transmitting the UFID from the host device to the storage device; and
generating a key for encrypting or decrypting write data corresponding to the generated file, based on the UFID received from the host device and a random number.

17. The method of claim 16, further comprising:
generating a write command according to a write request associated with the generated file;
transmitting the write command, the UFID, and the write data from the host device to the storage device;
encrypting the write data received from the host device by using the key; and
storing the key in association with the UFID, and storing the encrypted write data, in a nonvolatile memory of the storage device.

18. The method of claim 17, further comprising:
generating a read command according to a read request associated with the generated file;
transmitting the read command and the UFID from the host device to the storage device; and
decrypting the encrypted write data stored in the nonvolatile memory by using the key stored in the nonvolatile memory in association with the UFID.

19. The method of claim 18, further comprising:
generating an erase command according to an erase request associated with the generated file;
transmitting the erase command and the UFID from the host device to the storage device; and
physically erasing the key stored in the nonvolatile memory in association with the UFID.

20. The method of claim 16, wherein the UFID is based on a start address of the at least one logical address corresponding to the generated file.

* * * * *